United States Patent
Hiasa

(10) Patent No.: US 11,271,474 B2
(45) Date of Patent: Mar. 8, 2022

(54) INTEGRATED CIRCUIT AND POWER SUPPLY CIRCUIT

(71) Applicant: FUJI ELECTRIC CO., LTD., Kawasaki (JP)

(72) Inventor: Nobuyuki Hiasa, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 16 days.

(21) Appl. No.: 16/880,256

(22) Filed: May 21, 2020

(65) Prior Publication Data
US 2020/0395843 A1 Dec. 17, 2020

(30) Foreign Application Priority Data
Jun. 11, 2019 (JP) .............................. JP2019-108636

(51) Int. Cl.
*H02M 1/42* (2007.01)
*H02M 1/32* (2007.01)
*H02M 1/08* (2006.01)

(52) U.S. Cl.
CPC ........... *H02M 1/4225* (2013.01); *H02M 1/08* (2013.01); *H02M 1/32* (2013.01)

(58) Field of Classification Search
CPC ......... H02M 1/0006; H02M 1/08–096; H02M 1/32; H02M 1/42; H02M 1/4208; H02M 1/4225; H02M 3/155–1588; H02H 7/1213; H03K 17/08; H03K 17/081; H03K 17/08104; H03K 17/0812; H03K 17/08122; H03K 17/0814; H03K 17/08142; H03K 17/082; H03K 17/0822
See application file for complete search history.

(56) References Cited

U.S. PATENT DOCUMENTS

2020/0112265 A1* 4/2020 Hara ...................... H02M 1/08
2021/0159778 A1* 5/2021 Otsuka .................. H02M 1/088

FOREIGN PATENT DOCUMENTS

| JP | 2002-318625 A | 10/2002 | |
|---|---|---|---|
| JP | 2004-048341 A | 2/2004 | |
| JP | 2010-258948 A | 11/2010 | |
| JP | 2016-103884 A | 6/2016 | |
| JP | 2016-136805 A | 7/2016 | |
| WO | WO-2020158853 A1 * | 8/2020 | ............ H02M 7/48 |
| WO | WO-2021048973 A1 * | 3/2021 | ............ H02M 7/48 |

* cited by examiner

*Primary Examiner* — Fred E Finch, III
(74) *Attorney, Agent, or Firm* — Rabin & Berdo, P.C.

(57) ABSTRACT

A power supply circuit, including a rectifier circuit, an inductor having a voltage from the rectifier circuit applied thereto, a transistor for controlling a current flowing through the inductor, and an integrated circuit that performs switching of the transistor. The integrated circuit includes a signal generating circuit that generates a drive signal that reaches first and second logic levels to respectively turn on and off the transistor, a buffer circuit that generates first and second voltages for turning on and off the transistor based on the drive signal at the first and second logic levels, respectively, a detection circuit that detects elapse of a time period from when the drive signal reaches the first logic level to a predetermined timing before the drive signal reaches the second logic level, and a determination circuit that determines whether the terminal is short-circuited when the time period has elapsed since the drive signal reaches the first logic level.

12 Claims, 14 Drawing Sheets

INTEGRATED CIRCUIT AND POWER SUPPLY CIRCUIT

CROSS-REFERENCE TO RELATED APPLICATIONS

The present application claims priority pursuant to 35 U.S.C. § 119 from Japanese patent application number 2019-108636 filed on Jun. 11, 2019, the entire disclosure of which is hereby incorporated by reference herein.

BACKGROUND

Technical Field

The present invention relates to an integrated circuit and a power supply circuit.

Description of the Related Art

An AC-DC converter or a DC-DC converter may use a switching control IC that controls switching of a discrete transistor (for example, Japanese Patent Application Publication No. 2016-136805).

In recent years, a transistor that converts larger power than conventional transistor may have been used. Thus, the drive capacity of a buffer circuit in a switching control IC that controls the transistor has been improved.

If the output of the buffer circuit and, for example, a ground line of a substrate are short-circuited, a significantly large current may flow through the buffer circuit in some cases. In order to prevent the buffer circuit from being destroyed due to overcurrent, it is necessary to figure out whether the output of the buffer circuit and the line of the substrate are short-circuited when the buffer circuit is operated.

The present disclosure has been achieved in view of the foregoing issue, and an object thereof is to provide an integrated circuit capable of determining whether the output of a buffer circuit and a line of a substrate are short-circuited.

SUMMARY

A main aspect of the present disclosure for solving an issue described above is an integrated circuit comprising: a signal generating circuit that generates a drive signal that reaches one logic level to turn on a transistor and reaches another logic level to turn off the transistor; a buffer circuit that generates, at a terminal, a voltage for turning on the transistor based on the drive signal at the one logic level, and generates, at the terminal, a voltage for turning off the transistor based on the drive signal at the other logic level; a detection circuit that detects that a first time period has elapsed, the first time period being a time period from a timing when the drive signal reaches the one logic level to a predetermined timing before the drive signal reaches the other logic level; and a determination circuit that determines whether the terminal is short-circuited when it is detected that the first time period has elapsed since the drive signal reaches the one logic level.

According to the present disclosure, it is possible to provide an integrated circuit capable of determining whether the output of a buffer circuit and a line of a substrate are short-circuited.

BRIEF DESCRIPTION OF THE DRAWINGS

FIG. 8 is a diagram for explaining an operation of a power-factor correction IC 25a.

DETAILED DESCRIPTION

At least the following details will become apparent from descriptions of the present specification and of the accompanying drawings.

Present Embodiment

Figure 1:
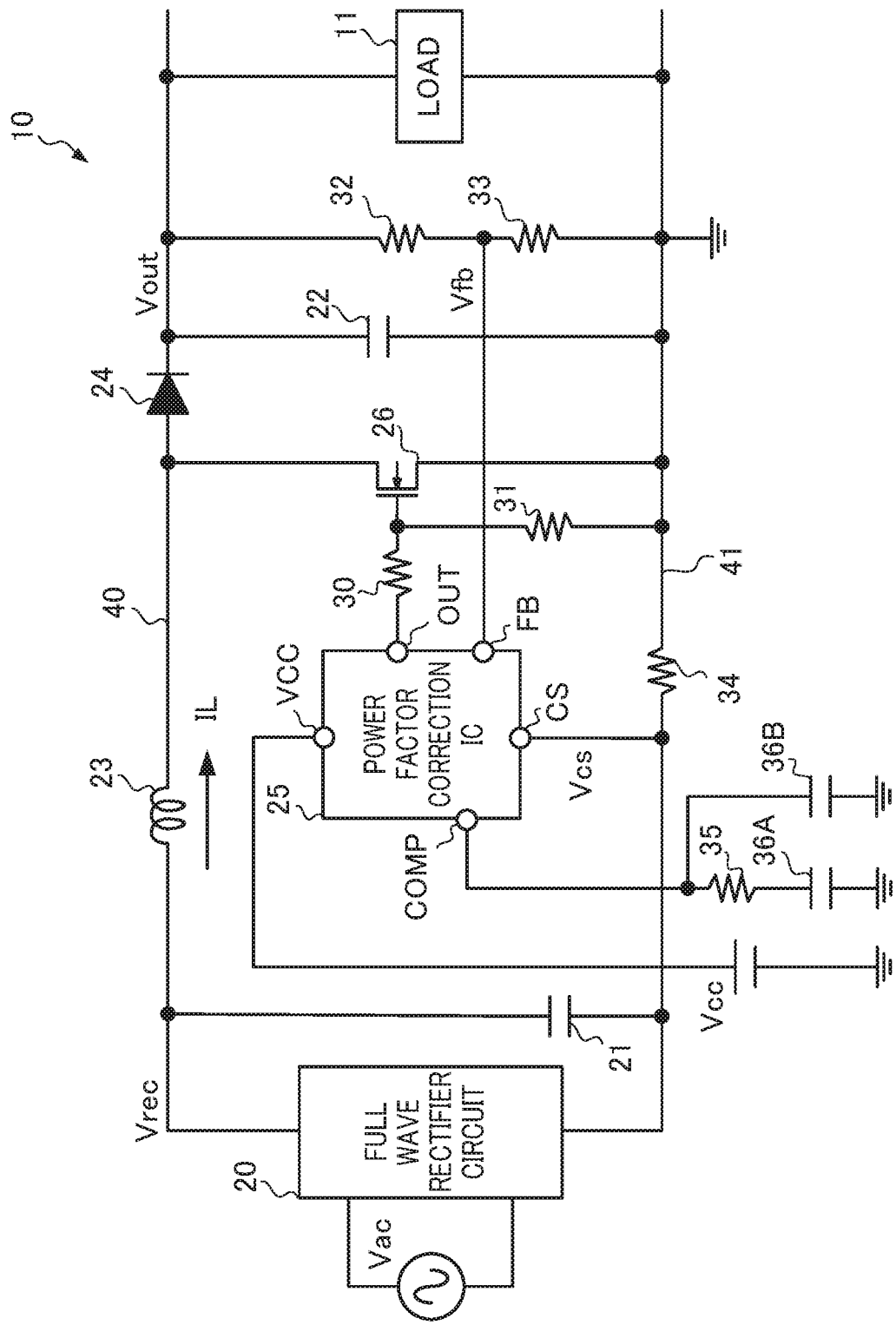
FIG. 1 is a diagram illustrating one example of an AC-DC converter 10.

FIG. 1 is a diagram illustrating a configuration of an AC-DC converter 10 according to one embodiment of the present disclosure. The AC-DC converter 10 is a boost-chopper-type power supply circuit that generates an output voltage Vout at a target level from an AC voltage Vac of a commercial power supply. A load 11 is a DC-DC converter or an electronic device that operates with a direct current voltage, for example.

<<<Outline of AC-DC Converter 10>>>

The AC-DC converter 10 comprises a full-wave rectifier circuit 20, capacitors 21, 22, 36A, and 36B, an inductor 23, a diode 24, a power factor correction IC 25, an NMOS transistor 26, resistors 30 to 35, a power supply line 40, and a ground line 41.

The full-wave rectifier circuit 20 full-wave rectifies the applied predetermined AC voltage Vac, and outputs the rectified voltage, as a voltage Vrec, to a capacitor 21 and the inductor 23. Note that the AC voltage Vac has, for example, a voltage of 100 to 240 V and a frequency of 50 to 60 Hz.

The capacitor 21 smooths the voltage Vrec, and the capacitor 22, the inductor 23, the diode 24, and the NMOS transistor 26 configure a boost chopper circuit. Accordingly, the charge voltage of the capacitor 22 results in a DC output voltage Vout. Note that the output voltage Vout is, for example, 400 V.

The power factor correction IC 25 is an integrated circuit that controls switching of the NMOS transistor 26 such that the output voltage Vout reaches the target level (e.g., 400 V)

while improving a power factor of the AC-DC converter 10. In specific, the power factor correction IC 25 drives the NMOS transistor 26 based on an inductor current IL flowing through the inductor 23 and the output voltage Vout.

The details of the power factor correction IC 25 will be described later, but the power factor correction IC 25 has terminals VCC, CS, FB, COMP, and OUT. Note that the power factor correction IC 25 has terminals other than the foregoing five terminals, but they are omitted for convenience. Further, the power factor correction IC 25 corresponds to a "switching control circuit" that controls switching of an NMOS transistor 26.

The NMOS transistor 26 is a switching device that controls power to the load 11 in the AC-DC converter 10. In an embodiment of the present disclosure, it is assumed that the NMOS transistor is a Metal Oxide Semiconductor (MOS) transistor, but the present disclosure is not limited thereto. The NMOS transistor 26 may be, for example, a PMOS transistor or an Insulated Gate Bipolar Transistor (IGBT), as long as it is a power transistor capable of controlling power.

Note that the resistor 30 for reducing switching noise is connected between the gate electrode (control electrode) of the NMOS transistor 26 and the terminal OUT. Further, a resistor 31 for pulling down the voltage at the gate electrode of the NMOS transistor 26 is provided between the gate electrode of the NMOS transistor 26 and ground.

The resistors 32 and 33 configure a voltage divider circuit that divides the output voltage Vout, and generates a feedback voltage Vfb to be used when switching of the NMOS transistor 26 is performed. The feedback voltage Vfb generated at the node at which the resistors 32 and 33 are connected is applied to the terminal FB.

The resistor 34 detects the inductor current IL, and has one end connected to the source electrode of the NMOS transistor 26 and the other end connected to the terminal CS. Note that, in an embodiment of the present disclosure, a voltage, indicative of the inductor current IL, to be input to the terminal CS is given as a voltage Vcs.

The voltage Vcs is to be applied to the terminal CS from an inverting amplifier circuit (not illustrated) that inverts and amplifies the voltage generated at the resistor 34 with reference to the voltage (0 V) at the source electrode of the grounded NMOS transistor 26, for example. In this case, the voltage Vcs to be applied to the terminal CS increases with an increase in the inductor current IL. Note that such inversion between positive and negative polarities may be performed inside the power factor correction IC 25. Further, for example, voltage divider resistors (not illustrated) may be provided between a power supply inside the power factor correction IC 25 and the terminal CS, to level-shift the voltage Vcs at the terminal CS to a positive voltage.

The resistor 35 and the capacitors 36A and 36B, which will be described later in detail, are elements for phase compensation of the power factor correction IC 25 that is feedback-controlled. The resistor 35 and the capacitor 36A are connected in series between the terminal COMP and the ground, and the capacitor 36B is connected in parallel therewith.

A power supply voltage Vcc for operating the power factor correction IC 25 is applied to the terminal VCC. Note that the power supply voltage Vcc is generated based on a voltage of an auxiliary inductor (not illustrated) magnetically coupled to the inductor 23, for example.

A power supply line 40 is a line on the power supply side, to which the smoothed voltage Vrec is applied via the inductor 23. A ground line 41 is a line on the ground side, to which the voltage (predetermined voltage) on the ground side of the full-wave rectifier circuit 20 is applied via the resistor 34. Note that the power supply line 40 and the ground line 41 constitute, for example, pattern wiring mounted onto a substrate (not illustrated) provided with the AC-DC converter 10. Accordingly, a ground pattern (not illustrated) of the substrate corresponds to the ground line 41.

Further, in an embodiment of the present disclosure, the "power supply line 40" and the "ground line 41" include wiring connected to each of the lines via an element having a small impedance. In other words, the power supply line 40 includes wiring between the node on the power supply side of the full-wave rectifier circuit 20 and the inductor 23, and the ground line 41 includes wiring between the node on the ground side of the full-wave rectifier circuit 20 and the resistor 34.

===First Embodiment of Power Factor Correction IC (Pulse-by-Pulse Method)===

Figure 2:
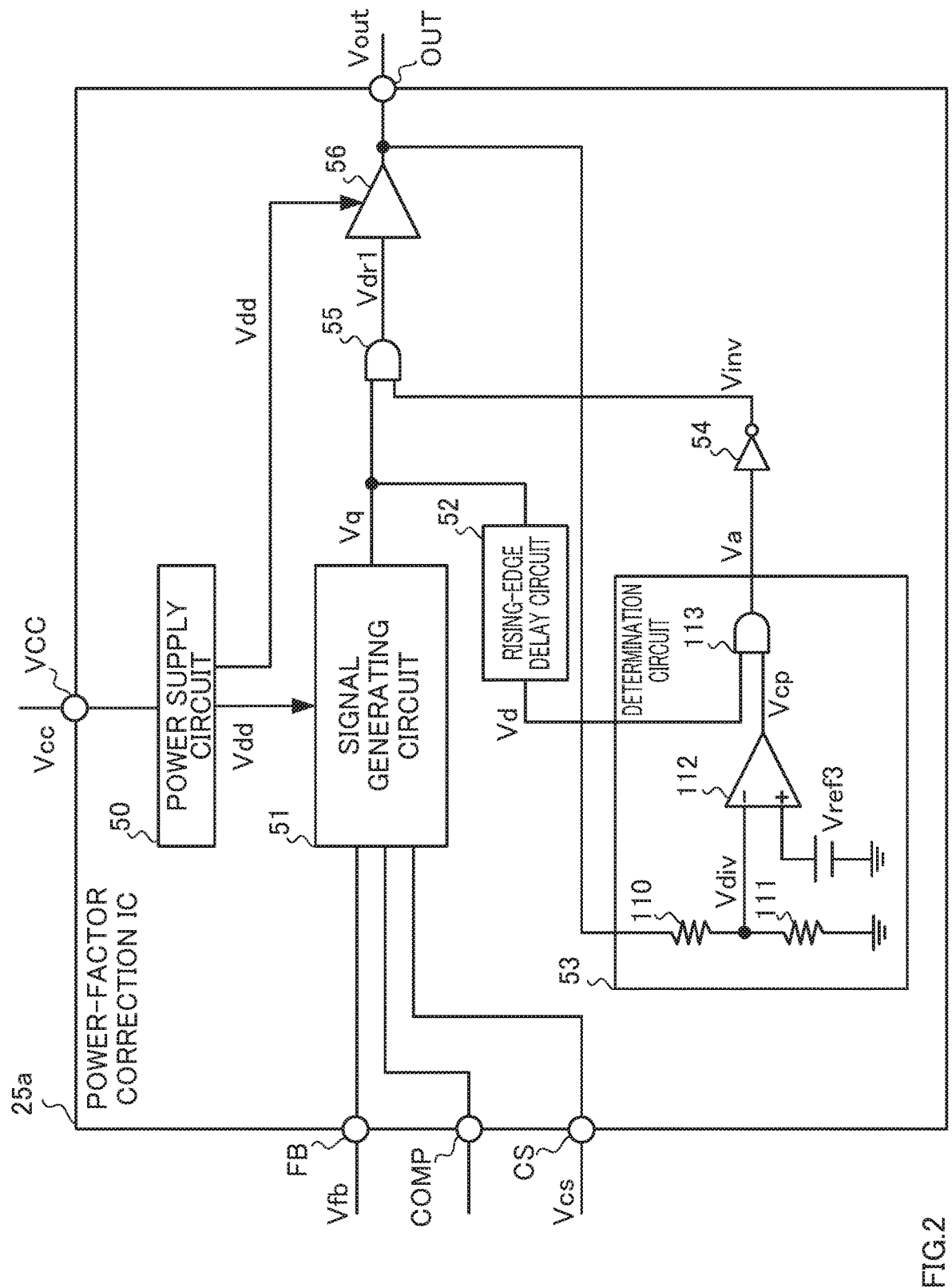
FIG. 2 is a diagram illustrating one example of a power-factor correction IC according to a first embodiment of the present disclosure.

FIG. 2 is a diagram illustrating one example of a power factor correction IC 25a, which is a power factor correction IC according to a first embodiment of the present disclosure. The power factor correction IC 25a is a circuit that protects a buffer circuit 56 (described later) by a pulse-by-pulse method when the terminal OUT and the ground line 41 are short-circuited. Note that, in an embodiment of the present disclosure, a condition in which the terminal OUT and the ground line 41 on the ground side are short-circuited is referred to as a "ground fault".

The power factor correction IC 25a comprises a power supply circuit 50, a signal generating circuit 51, a rising-edge delay circuit 52, a determination circuit 53, an inverter 54, an AND circuit 55, and the buffer circuit 56. Note that FIG. 2 illustrates the terminals at positions different from the positions illustrated in FIG. 1 such that, for example, the terminal FB is provided on the same side as the terminal COMP for convenience sake, however, wiring connected to the terminals, the elements, and the like are the same between FIG. 1 and FIG. 2.

The power supply circuit 50 supplies a power supply voltage from the power supply voltage Vcc to the blocks in the power factor correction IC 25a, and includes, for example, a series regulator. Note that the power supply voltage generated by the power supply circuit 50 in an embodiment of the present disclosure is referred to as a power supply voltage Vdd. Although not illustrated in FIG. 2 for convenience, the power supply voltage Vdd is also supplied to the rising-edge delay circuit 52, the determination circuit 53, and the like.

The signal generating circuit 51 generates a drive signal Vq for turning on and off the NMOS transistor 26 based on the voltage Vcs indicative of the inductor current IL and the feedback voltage Vfb.

The rising-edge delay circuit 52 generates timing at which the determination circuit 53 (described later) determines whether the ground fault occurs at the terminal OUT or not. Specifically, the rising-edge delay circuit 52 generates a signal Vd obtained by delaying the rising edge of the drive signal Vq by a predetermined time period.

The determination circuit 53 determines whether the ground fault occurs at the terminal OUT based on a signal Vd from the rising-edge delay circuit 52. Although described later in detail, the determination circuit 53 outputs a low-level (hereinafter, also referred to as "low") signal Va when no ground fault occurs at the terminal OUT, and outputs a high-level (hereinafter, also referred to as "high") signal Va when the ground fault occurs at the terminal OUT.

The inverter 54 inverts the logic level of the signal Va, and the AND circuit 55 calculates the logical product of the drive signal Vq from the signal generating circuit 51 and a signal Vinv from the inverter 54, and outputs a signal Vdr1 to be input to the buffer circuit 56. Note that the AND circuit 55 corresponds to a "signal output circuit".

The buffer circuit 56 is a drive circuit that performs switching of the NMOS transistor 26, which is connected to the terminal OUT and has a large gate capacity, based on the input signal Vdr1. Specifically, when the input signal Vdr1 is high, the buffer circuit 56 changes the voltage Vout at the terminal OUT to high. As a result, the NMOS transistor 26 is turned on.

When the input signal Vdr1 is low, the buffer circuit 56 changes the voltage Vout at the terminal OUT to low. As a result, the NMOS transistor 26 is turned off.

Here, when the determination circuit 53 outputs the low-level signal Va indicating that no ground fault occurs at the terminal OUT, the signal Vinv of the inverter 54 goes high. As a result, the drive signal Vq from the signal generating circuit 51 is output as the input signal Vdr1 to the buffer circuit 56. Accordingly, switching of the NMOS transistor 26 is performed based on the drive signal Vq from the signal generating circuit 51.

When the determination circuit 53 outputs the high-level signal Va indicating that the ground fault occurs at the terminal OUT, the signal Vinv of the inverter 54 goes low. As a result, the input signal Vdr1 goes low as well, and thus the NMOS transistor 26 is turned off.

In an embodiment of the present disclosure, the determination circuit 53 outputs the signal Va indicative of the determination result every time when the drive signal Vq goes high. Accordingly, although described later in detail, while the ground fault is occurring at the terminal OUT, the buffer circuit 56 is to be protected every time when the drive signal Vq goes high.

<<Signal Generating Circuit 51>>

Figure 3:
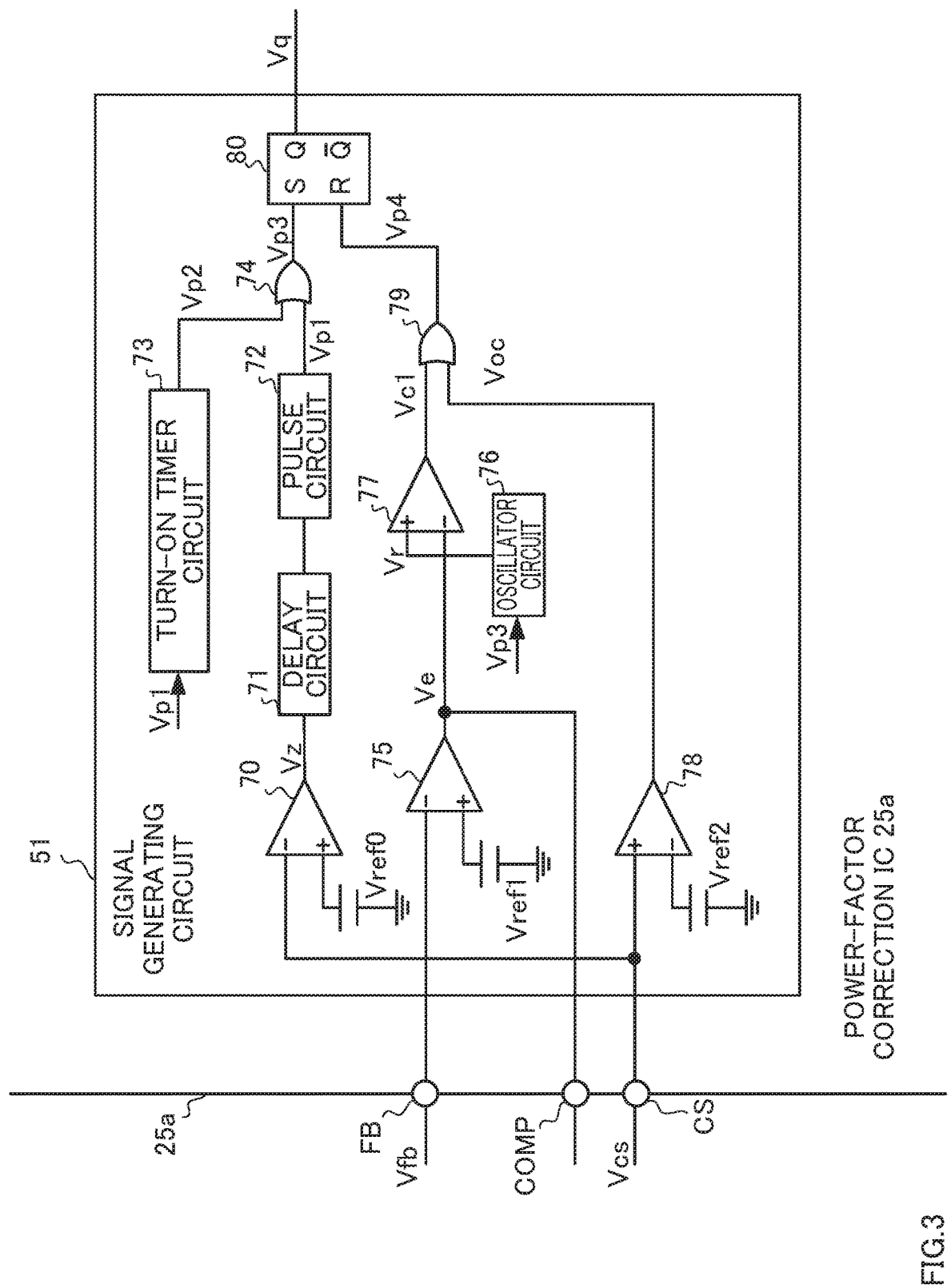
FIG. 3 is a diagram illustrating one example of a signal generating circuit 51.

FIG. 3 is a diagram for explaining one example of the signal generating circuit 51. The signal generating circuit 51 generates the drive signal Vq for turning on and off the NMOS transistor 26 based on the voltage Vcs indicative of the inductor current IL and the feedback voltage Vfb. The signal generating circuit 51 comprises comparators 70, 77, and 78, a delay circuit 71, a pulse circuit 72, a turn-on timer circuit 73, an OR circuit 74 and 79, an error amplifier circuit 75, an oscillator circuit 76, and an SR flip-flop 80.

The comparator 70 detects whether the current value of the inductor current IL is substantially zero. Specifically, the comparator 70 compares levels between the voltage Vcs applied to the terminal CS and the reference voltage Vref0 corresponding to a "current value Ia" slightly greater than zero (such as several mA), and detects whether the current value of the inductor current IL is substantially zero (hereinafter, "substantially zero" is simply referred to as zero). Although described later in detail, in an embodiment of the present disclosure, when the voltage Vcs decreases below the reference voltage Vref0, the comparator 70 outputs a high signal Vz indicating that the inductor current IL is zero.

When the high signal Vz is output from the comparator 70, the delay circuit 71 delays the signal Vz by a predetermined time period and outputs the delayed signal Vz.

When the high signal is output from the delay circuit 71, the pulse circuit 72 outputs a high pulse signal Vp1.

The turn-on timer circuit 73 outputs a pulse signal Vp2 for turning on the NMOS transistor 26, when the power factor correction IC 25a is activated, or when the AC voltage Vac is interrupted and the pulse signal Vp1 is not output. Specifically, when the pulse signal Vp1 is not output during a predetermined time period, the pulse signal Vp2 is output every predetermined time period.

The OR circuit 74 calculates and outputs a logical sum of the pulse signals Vp1 and Vp2. Accordingly, in an embodiment of the present disclosure, the pulse signal Vp1 or the pulse signal Vp2 is output from the OR circuit 74 as a pulse signal Vp3.

The error amplifier circuit 75 amplifies an error between the feedback voltage Vfb applied to the terminal FB and a predetermined reference voltage Vref1, and may be configured using a so-called transconductance amplifier. Note that the reference voltage Vref1 is determined according to the output voltage Vout at the target level. Further, the resistor 35 and the capacitors 36A and 36B for phase compensation are connected between the output of the error amplifier circuit 75 and the ground via the terminal COMP. It is assumed here that a voltage at a node at which the output of the error amplifier circuit 75 and the terminal COMP are connected is a voltage Ve.

The oscillator circuit 76 outputs a ramp wave Vr whose amplitude gradually increases every time when the high pulse signal Vp3 is input thereto.

The comparator 77 compares levels between the voltage Ve and the ramp wave Vr, and outputs the signal Vc1 as the comparison result. Here, the voltage Ve is applied to the inverting input terminal of the comparator 77, while the ramp wave Vr is applied to the non-inverting input terminal of the comparator 77. Accordingly, when the ramp wave Vr is lower in level than the voltage Ve, the signal Vc1 goes low, and when the ramp wave Vr increases higher in level than the voltage Ve, the signal Vc1 goes high.

The comparator 78 is an overcurrent detection circuit that detects whether the inductor current IL is in an overcurrent condition by comparing the voltage Vcs with a reference voltage Vref2. Note that the "overcurrent" refers to a condition in which the inductor current IL reaches a "current value Ib" (e.g., a current value corresponding to 90% of the current value allowable for the inductor 23 and the NMOS transistor 26). Accordingly, in an embodiment of the present disclosure, the level of the reference voltage Vref2 is set such that the voltage Vcs will be higher than the reference voltage Vref2 when the inductor current IL exceeds the "current value Ib". Note that the comparator 78 changes a voltage Voc to high when the overcurrent condition occurs and the voltage Vcs rises above the reference voltage Vref2.

The OR circuit 79 calculates and outputs the logical sum of the signal Vc1 and a high signal Voc indicating that the overcurrent occurs.

The signal Vp3 is input to the S input of the SR flip-flop 80, and a signal Vp4 is input to the R input thereof.

Accordingly, the drive signal Vq, which is the Q output of the SR flip-flop 80, goes high, when the signal Vp3 goes high. In contrast, the drive signal Vq, which is the Q output of the SR flip-flop 80, goes low, when the signal Vp4 goes high.

Accordingly, in an embodiment of the present disclosure, when the current value of the inductor current IL reaches zero and the signal Vp3 goes high, the high drive signal Vq for turning on the NMOS transistor 26 is output. In contrast, when the ramp wave Vr increases higher in level than the voltage Ve or the overcurrent is detected, the low drive signal Vq for turning off the NMOS transistor 26 is output.

<<Rising-Edge Delay Circuit 52>>

Figure 4:
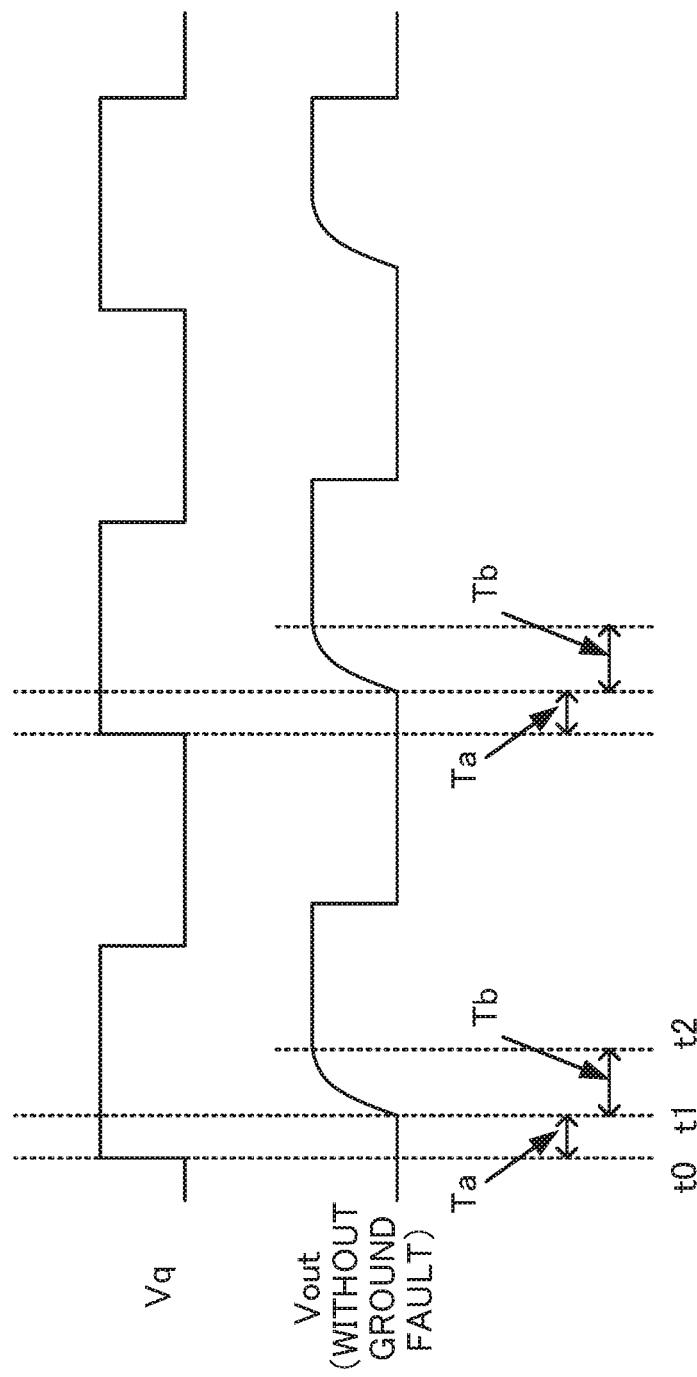
FIG. 4 is a diagram for explaining a transition of a voltage Vout at a terminal OUT.
Figure 5:
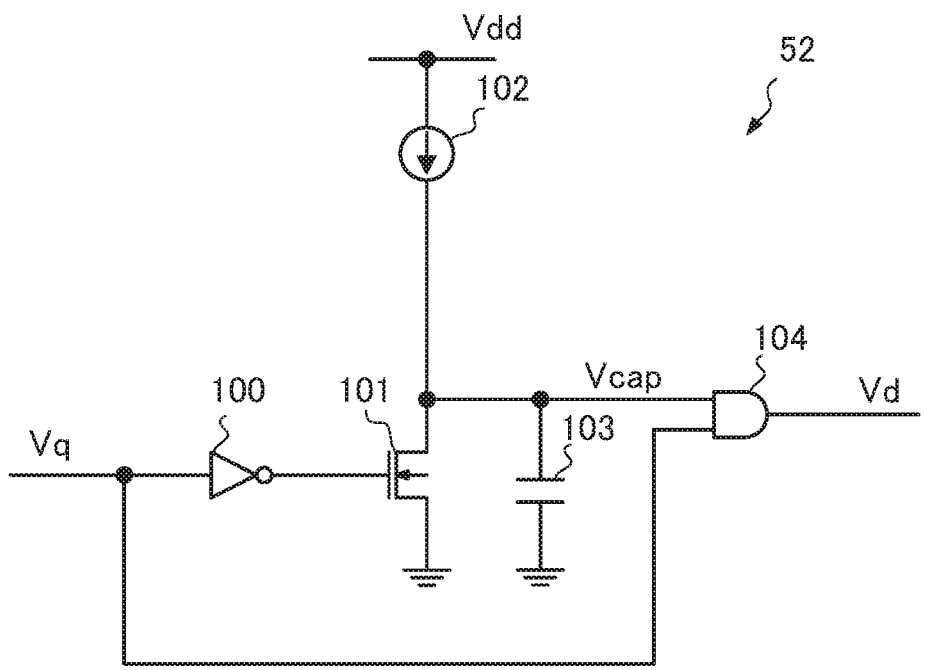
FIG. 5 is a diagram illustrating one example of a rising-edge delay circuit 52.
Figure 6:
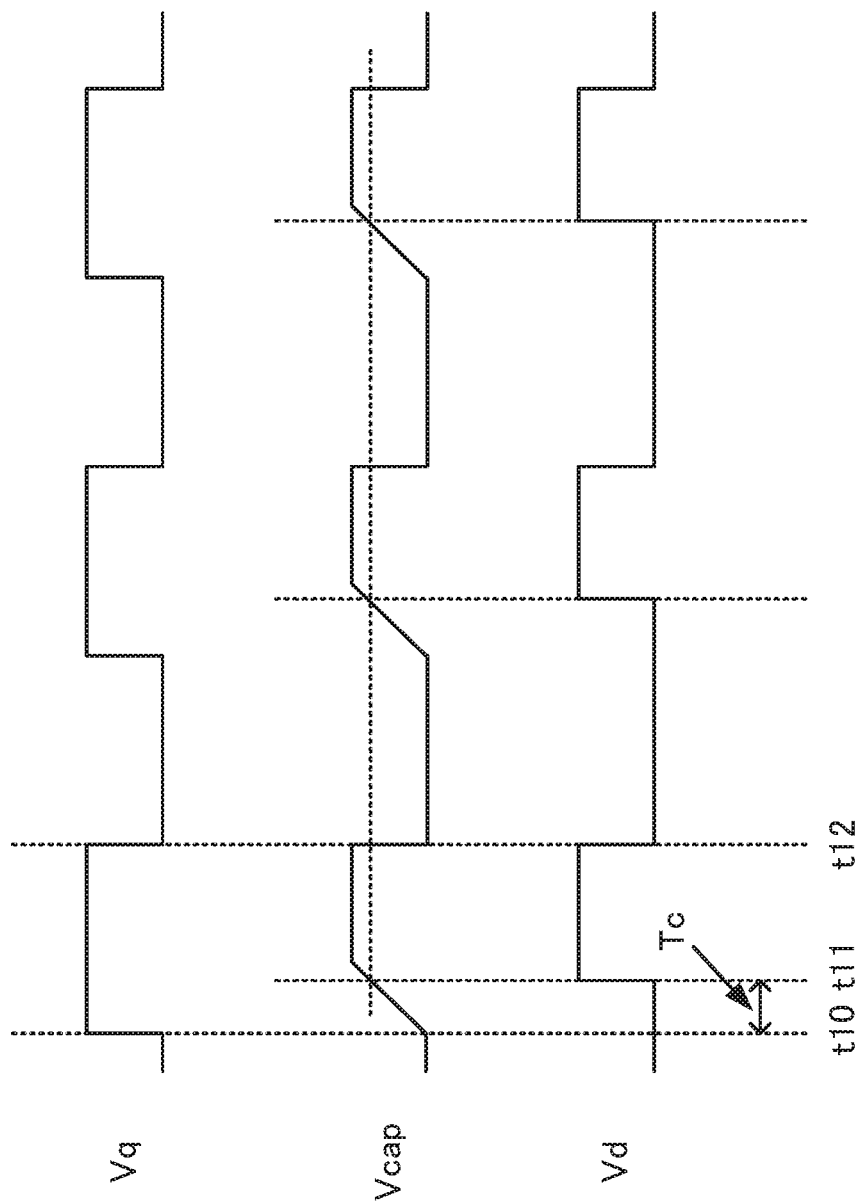
FIG. 6 is a diagram illustrating one example of an operation of a rising-edge delay circuit 52.

FIG. 4 is a diagram for explaining timing for determining whether the ground fault occurs at the terminal OUT. FIG. 5 is a diagram illustrating one example of a configuration of the rising-edge delay circuit 52. FIG. 6 is a diagram for explaining an operation of the rising-edge delay circuit 52.

Note here that timing for determining whether the ground fault occurs at the terminal OUT will be explained in the case where no ground fault occurs at the terminal OUT, for convenience. Accordingly, in this case, the low signal Va is output from the determination circuit 53, and thus the AND circuit 55 results in outputting the drive signal Vq as the input signal Vdr1.

When the high drive signal Vq for turning on the NMOS transistor 26 is output from the signal generating circuit 51 at t0 in FIG. 4, the buffer circuit 56 raises the voltage Vout at the terminal OUT at t1, which is a timing delayed by a predetermined time period Ta with respect to the rising edge of the drive signal Vq. Note that the "time period Ta" is a time period determined based on the delay time in the buffer circuit 56, for example.

Here, the NMOS transistor 26 is a power transistor for power conversion, and thus has a large gate-source parasitic capacitance, for example. Further, for example, the resistors 30 and 31 connected to the terminal OUT, and the gate-source parasitic capacitance configure a low-pass filter. As a result, the voltage Vout at the terminal OUT rises with a slope corresponding to a time constant of the resistor 30 and the parasitic capacitance from the time t1, Further, at time t2 at which a predetermined time period Tb has elapsed from the time t1, the voltage Vout at the terminal OUT goes high. Thus, when the time period Ta and the time period Tb have elapsed from the time at which the signal generating circuit 51 changes the drive signal Vq to high, the voltage Vout rises to a predetermined voltage level.

Accordingly, if the level of the voltage is substantially zero at a timing at which, for example, the time period "Ta+Tb" has elapsed since, for example, the drive signal Vq has gone high, the ground fault should occur at the terminal OUT. The rising-edge delay circuit 52 according to an embodiment of the present disclosure generates a timing at which the time period "Ta+Tb" has elapsed since the drive signal Vq has gone high, by delaying the rising edge of the drive signal Vq.

The rising-edge delay circuit 52 comprises an inverter 100, an NMOS transistor 101, a bias current circuit 102, a capacitor 103, and an AND circuit 104.

The inverter 100 inverts the logic level of the drive signal Vq, and outputs the inverted signal to the NMOS transistor 101.

The NMOS transistor 101 is turned on when the output from the inverter 100 is high, and discharges the capacitor 103. In contrast, when the output from the inverter 100 is low, the NMOS transistor is turned off, thereby charging the capacitor 103 with the current of the bias current circuit 102.

The AND circuit 104 calculates and outputs the logical product of the drive signal Vq and a charge voltage Vcap of the capacitor 103.

When the drive signal Vq goes high to turn on the NMOS transistor 26 at time t10 in FIG. 6, the NMOS transistor 101 is turned off. As a result, the capacitor 103 is charged, thereby gradually increasing the voltage Vcap.

Then, when the voltage Vcap reaches a level at which the AND circuit 104 determines that the level thereof is high, at time t11 at which a time period Tc has elapsed from the time t10, the signal Vd is changed to high. Accordingly, the AND circuit 104 detects that the time period Tc has elapsed from the time t10.

Further, when the drive signal Vq goes low at time t12, the NMOS transistor 101 is turned on, and thus the voltage Vcap goes low. Further, at this timing, the signal Vd goes low as well.

As such, the signal Vd according to an embodiment of the present disclosure is obtained by delaying the rising edge of the drive signal Vq by the predetermined time period Tc. Further, the "time period Tc" is longer than the foregoing "time period Ta+time period Tb". Thus, it becomes possible to determine whether the ground fault occurs at the terminal OUT by obtaining the voltage level at the terminal OUT at the timing of the rising edge of the signal Vd.

Further, in an embodiment of the present disclosure, the drive signal Vq from the signal generating circuit 51 corresponds to a "drive signal", and the time period Tc corresponds to a "first time period", and the rising-edge delay circuit 52 including the AND circuit 104 corresponds to a "detection circuit".

<<Determination Circuit 53>>

The determination circuit 53 illustrated in FIG. 2 determines whether the ground fault occurs at the terminal OUT at the timing at which the signal Vd goes high, and comprises resistors 110 and 111, a comparator 112, and an AND circuit 113.

The resistors 110 and 111 configure a voltage divider circuit that divides the voltage Vout, and the comparator 112 compares a voltage Vdiv obtained by dividing the voltage Vout with a predetermined reference voltage Vref3. In an embodiment of the present disclosure, the voltage Vref3 is set such that the voltage Vdiv obtained by dividing the voltage Vout when the NMOS transistor 26 is turned on is higher than the reference voltage Vref3.

The comparator 112 outputs a low signal when the voltage Vdiv is higher than the reference voltage Vref3, and outputs a high signal when the voltage Vdiv is lower than the reference voltage Vref3.

The AND circuit 113 outputs the comparison result Vcp of the comparator 112 as the signal Va when the signal Vd goes high. As a result, the determination circuit 53 outputs the low signal Va when no ground fault occurs at the terminal OUT at the timing at which the signal Vd goes high. In contrast, the determination circuit 53 outputs the high signal Va when the ground fault occurs at the terminal OUT at the timing at which the signal Vd goes high.

Accordingly, the AND circuit 113 operates as a mask circuit that masks the comparison result Vcp of the comparator 112 until the desired timing at which the signal Vd goes high.

<<Buffer Circuit 56>>

Figure 7:
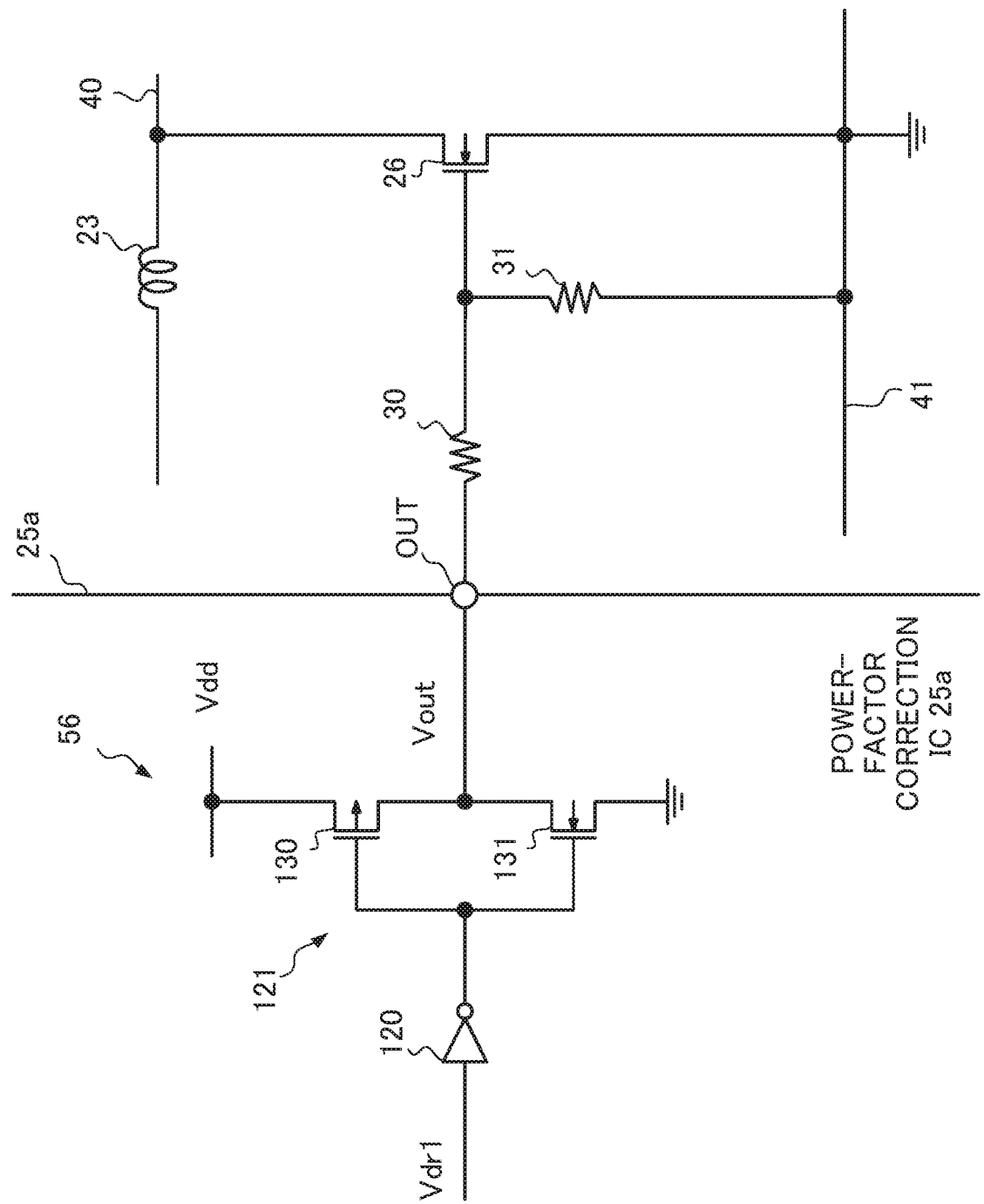
FIG. 7 is a diagram illustrating one example of a buffer circuit 56.

The buffer circuit 56 performs switching of the NMOS transistor 26 having a large capacitance connected to the terminal OUT based on the input signal Vdr1, and includes inverters 120 and 121 as illustrated in FIG. 7.

The inverter 120 inverts the logic level of the input signal Vdr1 and outputs the inverted input signal Vdr1, and the inverter 121 inverts the logic level of the output from the inverter 120 and outputs the inverted output.

Accordingly, when the input signal Vdr1 goes high, the output of the inverter 120 goes low, thereby turning on a PMOS transistor 130 in the inverter 121 and turning off an NMOS transistor 131. As a result, the buffer circuit 56 generates the high-level voltage Vout at the terminal OUT.

In contrast, when the input signal Vdr1 goes low, the output of the inverter 120 goes high, thereby turning off the PMOS transistor 130 and turning on the NMOS transistor 131. As a result, the buffer circuit 56 generates the low-level voltage Vout at the terminal OUT.

===Operation of Power Factor Correction IC 25a===
<<<In the Case where No Ground Fault Occurs at Terminal OUT>>>

Figure 8:
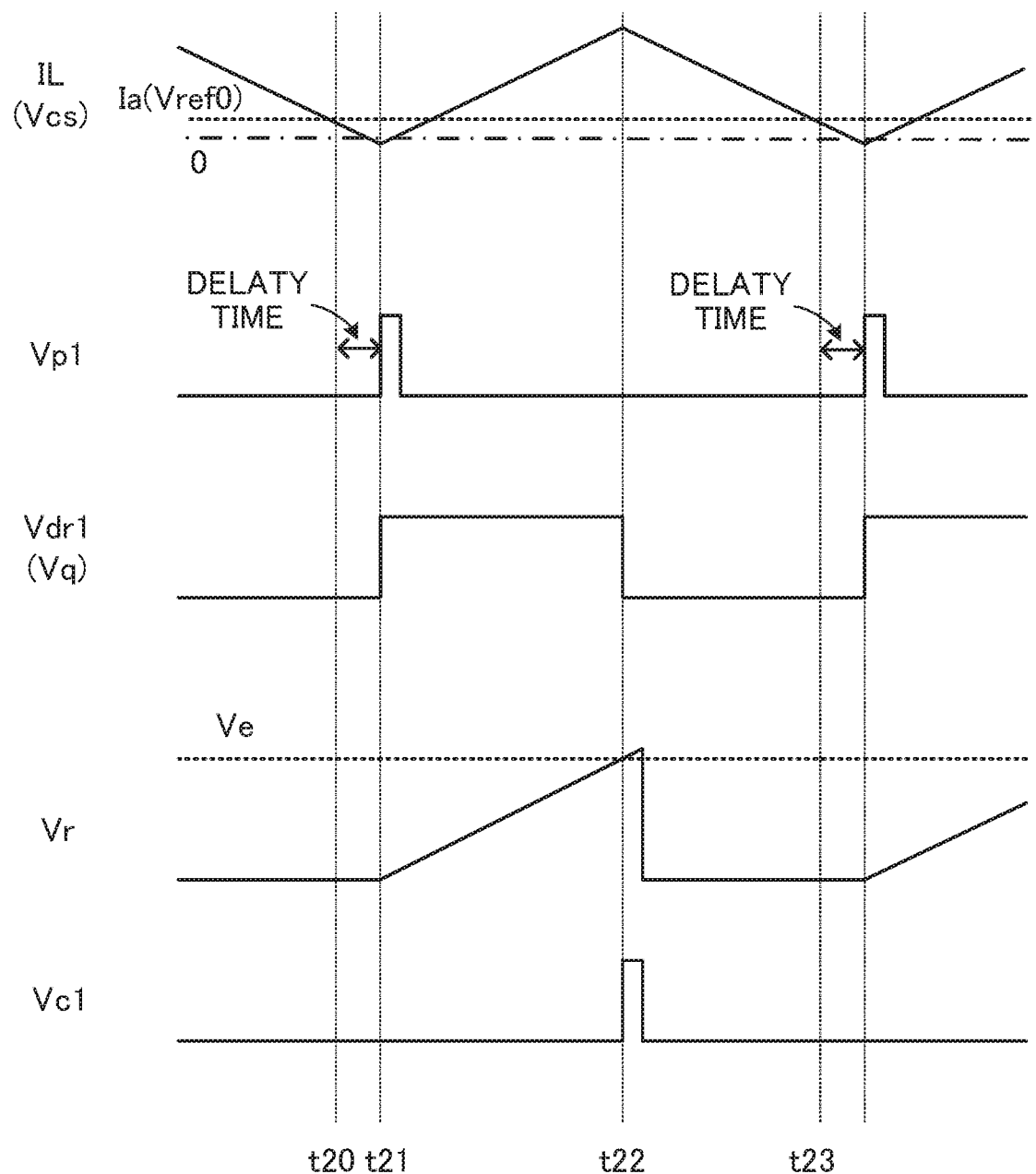

With reference to FIG. 8, the operation of the power factor correction IC 25a in the case where no ground fault occurs at the terminal OUT will be explained. Note here that since no ground fault occurs at the terminal OUT, the drive signal Vq results in the input signal Vdr1. Thus, the operation of the signal generating circuit 51 illustrated in FIG. 3 will be mainly explained.

First, when the inductor current IL decreases and reaches the "current value Ia" at time t20, that is, the voltage Vcs lowers and reaches the reference voltage Vref0, the comparator 70 changes the signal Vz to high (not illustrated in FIG. 8). Further, at time t21 at which the delay time in the delay circuit 71 has elapsed since the time t20, the pulse circuit 72 outputs the pulse signal Vp1.

Then, when the pulse signal Vp1 is output, the SR flip-flop 80 outputs the high drive signal Vq, and thus the input signal Vdr1 goes high as well. This results in turning on the NMOS transistor 26 and increasing the inductor current IL.

Further, when the pulse signal Vp1 is output, the pulse signal Vp3 goes high as well, and thus the amplitude of the ramp wave Vr from the oscillator circuit 76 increases. Then, when the amplitude level of the ramp wave Vr increases higher than the level of the voltage Ve at time t22, the comparator 77 changes the signal Vc1 to high. As a result, the SR flip-flop 80 is reset, and the input signal Vdr1 goes low accordingly. When the input signal Vdr1 goes low, the NMOS transistor 26 is turned off, and thus the inductor current IL gradually decreases. Further, when the inductor current IL decreases and reaches the current value Ia at time t23, the operations from the time t20 are repeated.

Here, when the AC-DC converter 10 generates the output voltage Vout at the target level from the predetermined AC voltage Vac and supplies power to the load 11 that is constant, the feedback voltage Vfb is constant. As a result, the voltage Ve output from the error amplifier circuit 75 is constant as well, and thus a time period (e.g., a time period from the time t20 to the time t21) during which the NMOS transistor 26 is on is constant as well.

Further, when the level of the voltage Vrec obtained by rectifying the AC voltage Vac rises at the time of turning on of the NMOS transistor 26, the current value of the inductor current
IL also increases. As a result, the peak waveform of the inductor current IL results in the same waveform as of the voltage Vrec, thereby improving the power factor.
<<<In the Case where Ground Fault Occurs at Terminal OUT>>>

Figure 9:
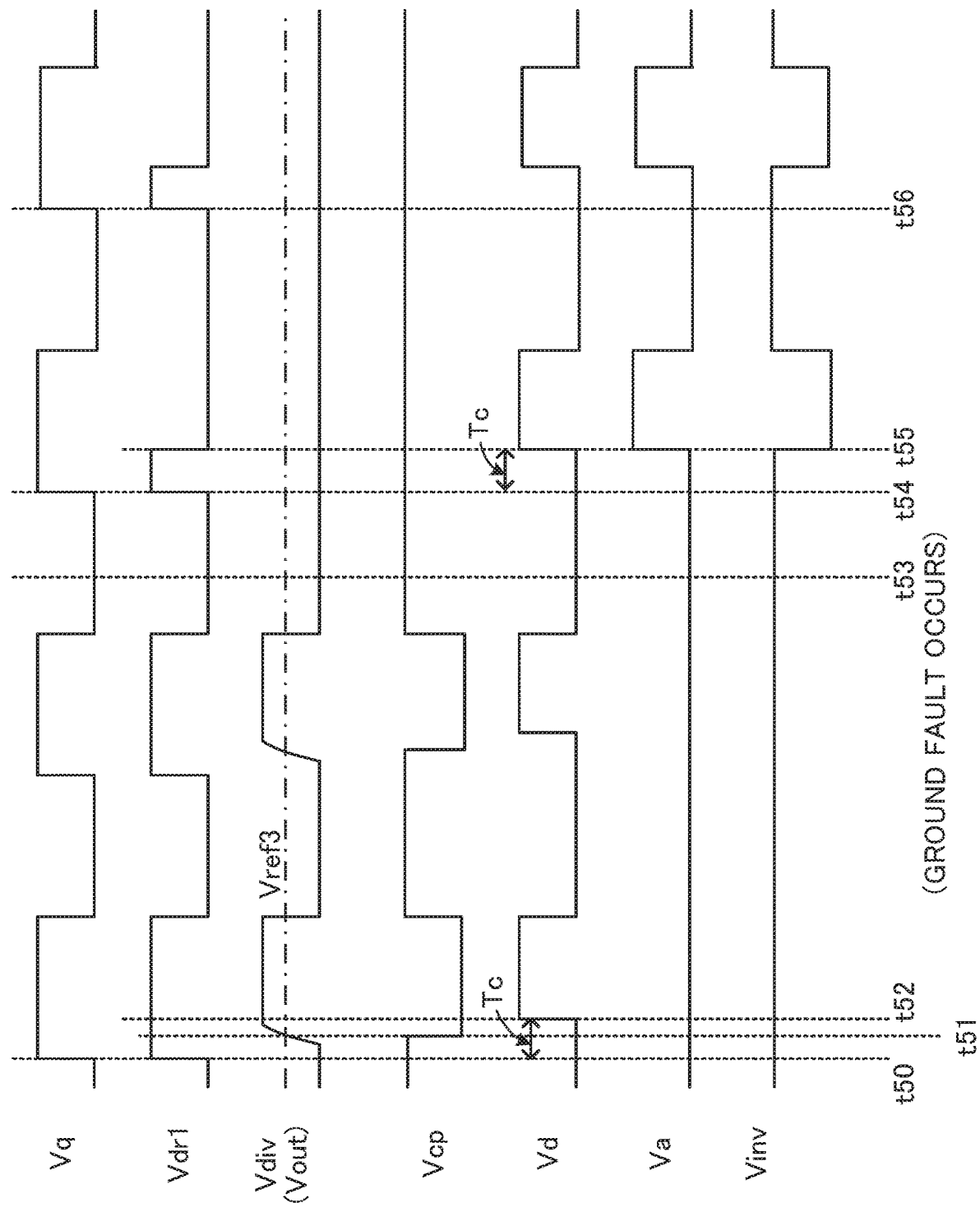
FIG. 9 is a diagram for explaining an operation of a power-factor correction IC 25a when a ground fault occurs.

With reference to FIG. 9, the operation of the power factor correction IC 25a when the ground fault occurs at the terminal OUT will be explained. Note here that the operations of the rising-edge delay circuit 52, the determination circuit 53, and the buffer circuit 56 will be mainly explained. Further, in an embodiment of the present disclosure, it is assumed that the ground fault occurs at the terminal OUT at the timing of time t53 (described later).

First, when the drive signal Vq of the signal generating circuit 51 goes high at time t50, the input signal Vdr1 goes high as well. Thus, the buffer circuit 56 raises the voltage Vout at the terminal OUT so as to turn on the NMOS transistor 26.

Then, when the voltage Vout rises, the voltage Vdiv obtained by dividing the voltage Vout using the resistors 110 and 111 increases higher than the reference voltage Vref3 at time t51, the comparator 112 changes the comparison result Vcp to low.

Further, at time t52 at which the time period Tc has elapsed from the time t50, the rising-edge delay circuit 52 changes the signal Vd obtained by delaying the rising edge of the drive signal Vq to high.

At the timing of the time t52, the comparison result Vcp is low, and thus the signal Va of the AND circuit 113 is low and the signal Vinv of the inverter 54 is high. Accordingly, when no ground fault occurs at the terminal OUT, the drive signal Vq from the signal generating circuit 51 is output as the input signal Vdr1.

Then, after the ground fault occurs at the terminal OUT at the time t53, when the drive signal Vq goes high at time t54, the input signal Vdr1 goes high as well. When the input signal Vdr1 goes high, the PMOS transistor 130 of the buffer circuit 56 illustrated in FIG. 7 is turned on, and the NMOS transistor 131 is turned off. However, since the ground fault occurs at the terminal OUT, the voltage Vout is maintained at zero, which results in a large current flowing through the PMOS transistor 130.

Then, at time t55 at which the time period Tc has elapsed from the time t54, the signal Vd goes high. Here, the voltage Vdiv is lower than the reference voltage Vref3 at the time t53, at which the ground fault occurs, and thereafter, and thus the comparison result Vcp is high.

Accordingly, when the signal Vd goes high at the time t55, the signal Va from the AND circuit 113 goes high. As a result, the signal Vinv of the inverter 54 goes low, and thus the input signal Vdr1 output from the AND circuit 55 is changed to low. Accordingly, the PMOS transistor 130 of the buffer circuit 56 is turned off, thereby preventing the overcurrent from flowing through the PMOS transistor 130.

As such, the input signal Vdr1 having gone high at the time t54 goes low at the timing (time t55) at which it is determined that the ground fault occurs. Note that, at time t56 and thereafter, the operations from the time t54 are repeated. As a result, when the ground fault occurs, the power factor correction IC 25a can protect the buffer circuit 56 from the overcurrent by the so-called pulse-by-pulse method.

When the ground fault having occurred at the time t53 is eliminated, the operation without ground fault, which has been explained in relation to the time t50, is resumed. Accordingly, The AC-DC converter 10 according to an embodiment of the present disclosure can drive the load 11 under the desired condition immediately when the ground fault is eliminated, while appropriately protecting the buffer circuit 56.

===Power Factor Correction IC According to Second Embodiment of the Present Disclosure (Latch Method)===

Figure 10:
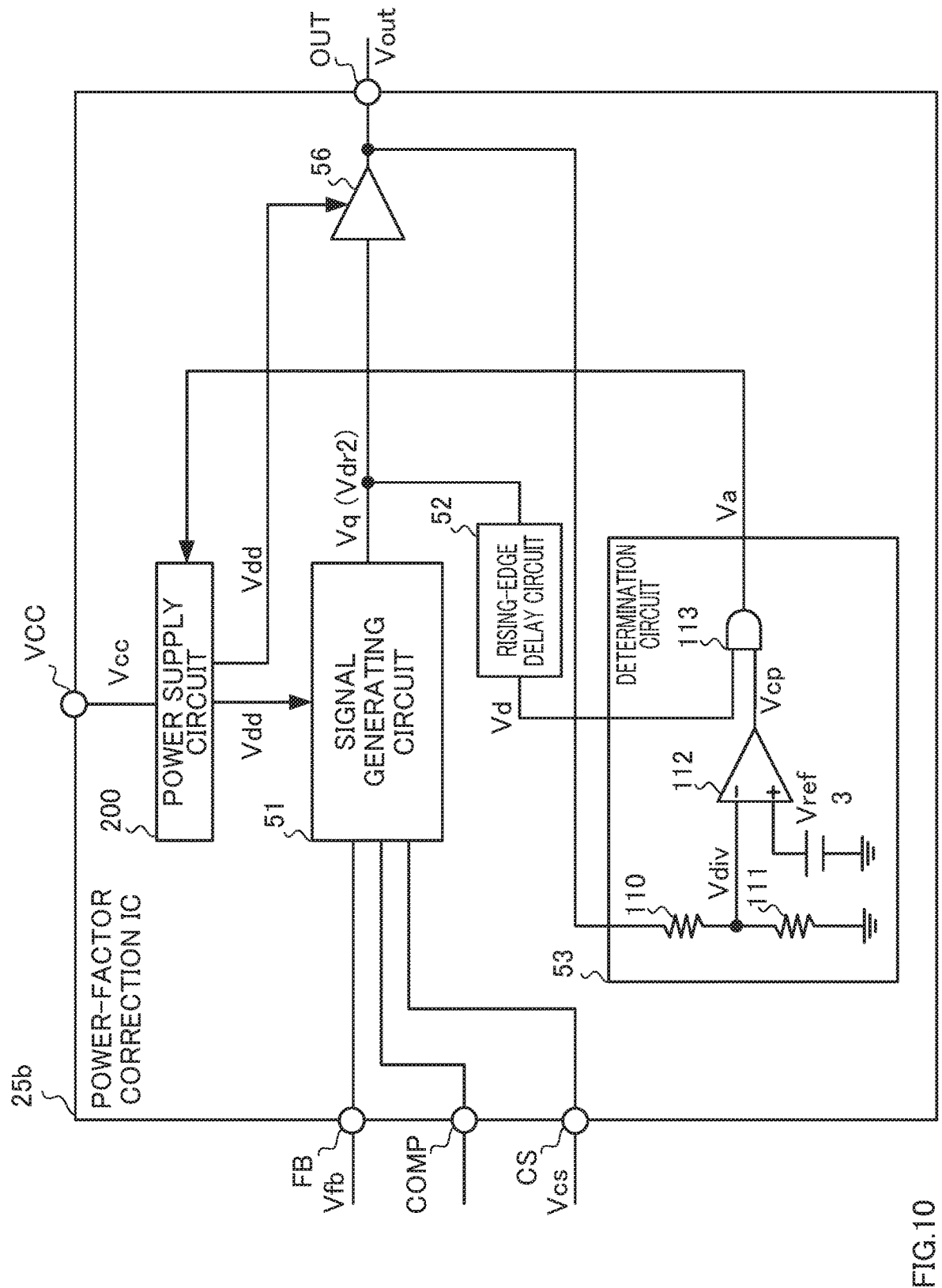
FIG. 10 is a diagram illustrating one example of a power-factor correction IC according to a second embodiment of the present disclosure.

FIG. 10 is a diagram illustrating one example of a power factor correction IC 25b, which is a power factor correction IC according to a second embodiment of the present disclosure. The power factor correction IC 25b employs a method of stopping the supply of the power supply voltage to the buffer circuit 56 when the ground fault occurs at the terminal OUT (hereinafter, referred to as the "latch method").

The power factor correction IC 25b comprises the signal generating circuit 51, the rising-edge delay circuit 52, the determination circuit 53, the buffer circuit 56, and a power supply circuit 200. Here, the inverter 54 and the AND circuit 55 included in the power factor correction IC 25a using the pulse-by-pulse method are not needed in the power factor correction IC 25b. Accordingly, the drive signal Vq from the signal generating circuit 51 is output to the buffer circuit 56 as the input signal Vdr2 for performing switching of the NMOS transistor 26.

Further, the blocks given the same numerical references are the same between the power factor correction IC 25b in FIG. 10 and the power factor correction IC 25a in FIG. 2. Thus, the power supply circuit 200 will be explained herein.

The power supply circuit 200 generates the power supply voltage Vdd from the power supply voltage Vcc, and supplies the voltage to the blocks in the power factor correction IC 25b. Further, the power supply circuit 200 stops supplying the power supply voltage Vdd to the blocks based on the high signal Va indicating the occurrence of the ground fault.

Thus, when the determination circuit 53 determines that the ground fault occurs at the terminal OUT, the power supply circuit 200 stops supplying the power supply voltage to the buffer circuit 56. This avoids a large current from flowing from the buffer circuit 56 to the terminal OUT, thereby protecting the buffer circuit 56.

Note that, for example, when the AC voltage Vac is applied again to generate the power supply voltage Vcc, the power supply circuit 200 generates the power supply voltage Vdd and supplies it to the blocks in the power factor correction IC 25b. At this time, if the ground fault at the terminal OUT is eliminated, the AC-DC converter 10 generates the voltage Vout at the target level.

===Power Factor Correction IC According to Third Embodiment of the Present Disclosure (Automatic Recovery Method)===

Figure 11:
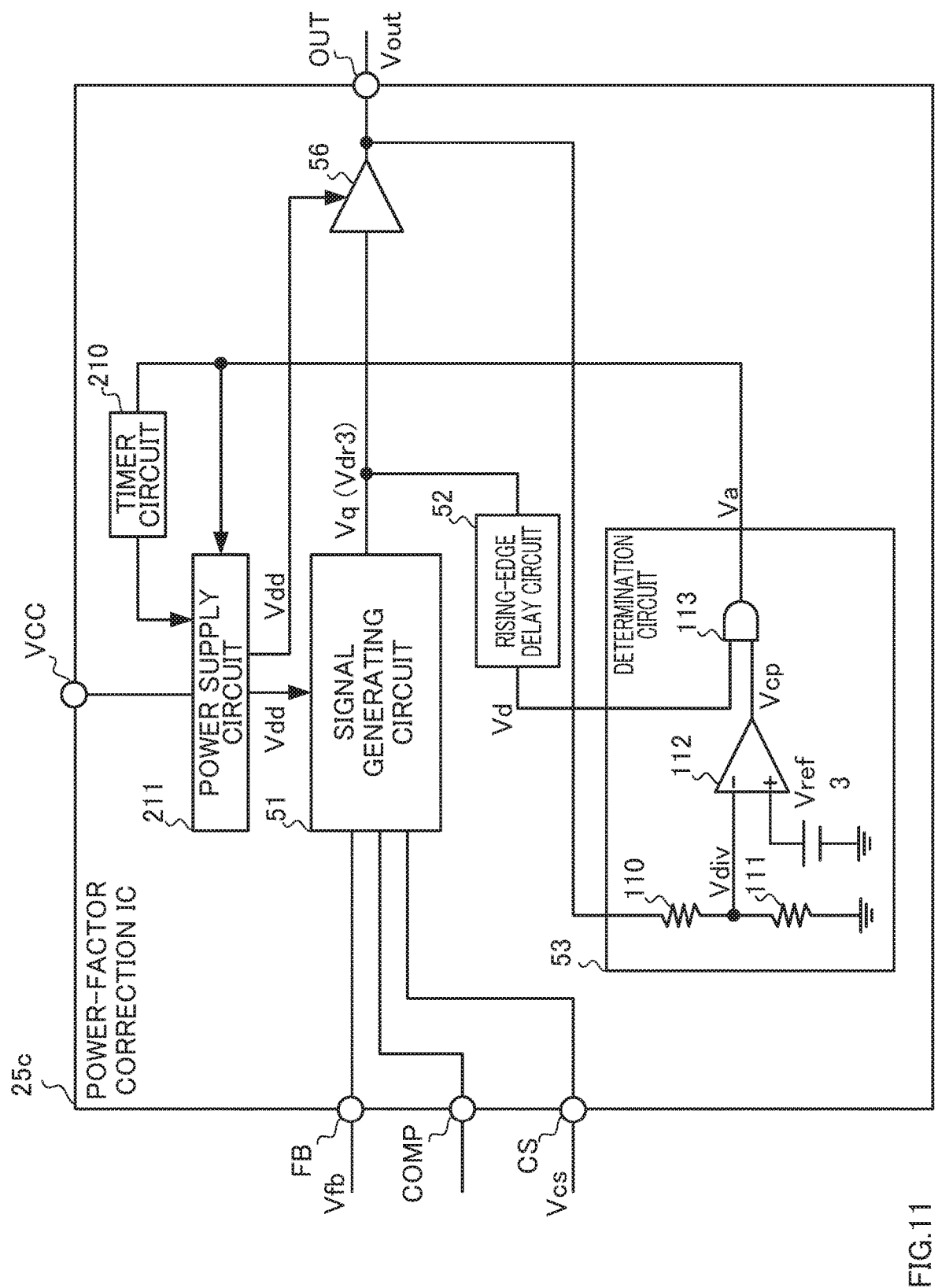
FIG. 11 is a diagram illustrating one example of a power-factor correction IC according to a third embodiment of the present disclosure.

FIG. 11 is a diagram illustrating one example of a power factor correction IC 25c, which is a power factor correction IC according to a third embodiment of the present disclosure. The power factor correction IC 25c employs a method of stopping the supply of the power supply voltage to the buffer circuit 56 when the ground fault occurs at the terminal OUT and resuming the supply after a predetermined time period (hereinafter, referred to as the "automatic recovery method").

The power factor correction IC 25c comprises the signal generating circuit 51, the rising-edge delay circuit 52, the determination circuit 53, the buffer circuit 56, a timer circuit 210, and a power supply circuit 211. Here, the inverter 54 and the AND circuit 55 included in the power factor correction IC 25a using the pulse-by-pulse method are not needed in the power factor correction IC 25c. Accordingly, the drive signal Vq from the signal generating circuit 51 is output to the buffer circuit 56 as the input signal Vdr3 for performing switching of the NMOS transistor 26.

Further, the blocks given the same numerical references are the same between the power factor correction IC 25c in FIG. 11 and the power factor correction ICs 25a and 25b. Thus, the timer circuit 210 and the power supply circuit 211 will be described.

The timer circuit 210 measures a predetermined time period Td (second time period) when the high signal Va indicating the occurrence of the ground fault is input thereto.

The power supply circuit 211 generates the power supply voltage Vdd from the power supply voltage Vcc, and supplies it to the blocks in the power factor correction IC 25c. Further, the power supply circuit 211 stops supplying the power supply voltage Vdd to the blocks based on the high signal Va indicating the occurrence of the ground fault. Further, when the ground fault occurs and the timer circuit 210 measures the time period Td, the power supply circuit 211 generates the power supply voltage Vdd and supplies it to the blocks in the power factor correction IC 25c.

Thus, when the determination circuit 53 determines that the ground fault occurs at the terminal OUT, the power supply circuit 211 stops supplying the power supply voltage to the buffer circuit 56. This avoids a large current from flowing from the buffer circuit 56 to the terminal OUT, thereby protecting the buffer circuit 56.

Further, the power supply circuit 211 supplies the power supply voltage Vdd to the signal generating circuit 51 and the buffer circuit 56 when the time period Td has elapsed from the occurrence of the ground fault. Thus, if the ground fault is eliminated at this timing, the power factor correction IC 25c performs switching of the NMOS transistor 26 so as to generate the output voltage Vout at the target level.

===Power Factor Correction IC According to Fourth Embodiment of the Present Disclosure (Setting of Drive Capacity and Protection Method)===

Figure 12:
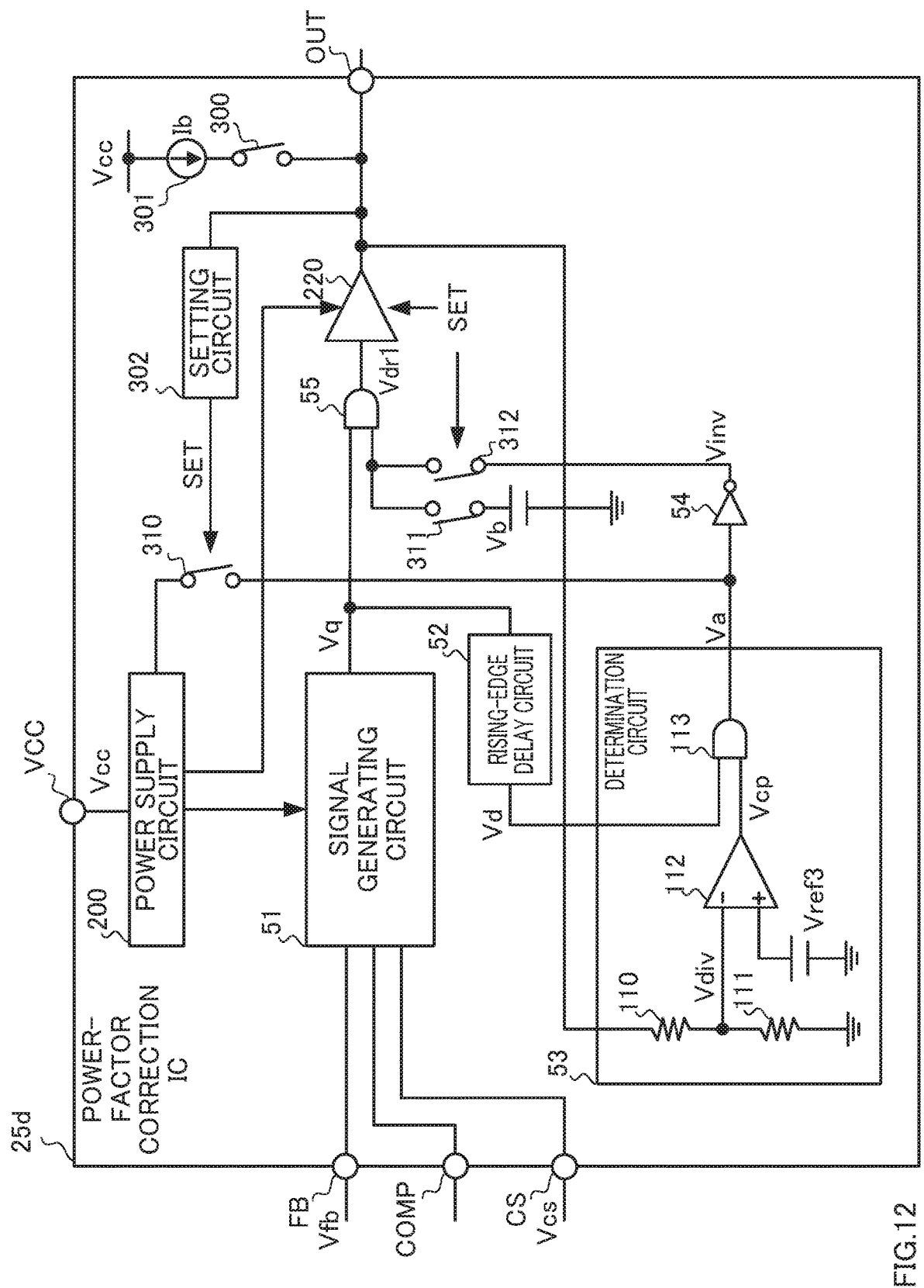
FIG. 12 is a diagram illustrating one example of a power-factor correction IC according to a fourth embodiment of the present disclosure.
Figure 13:
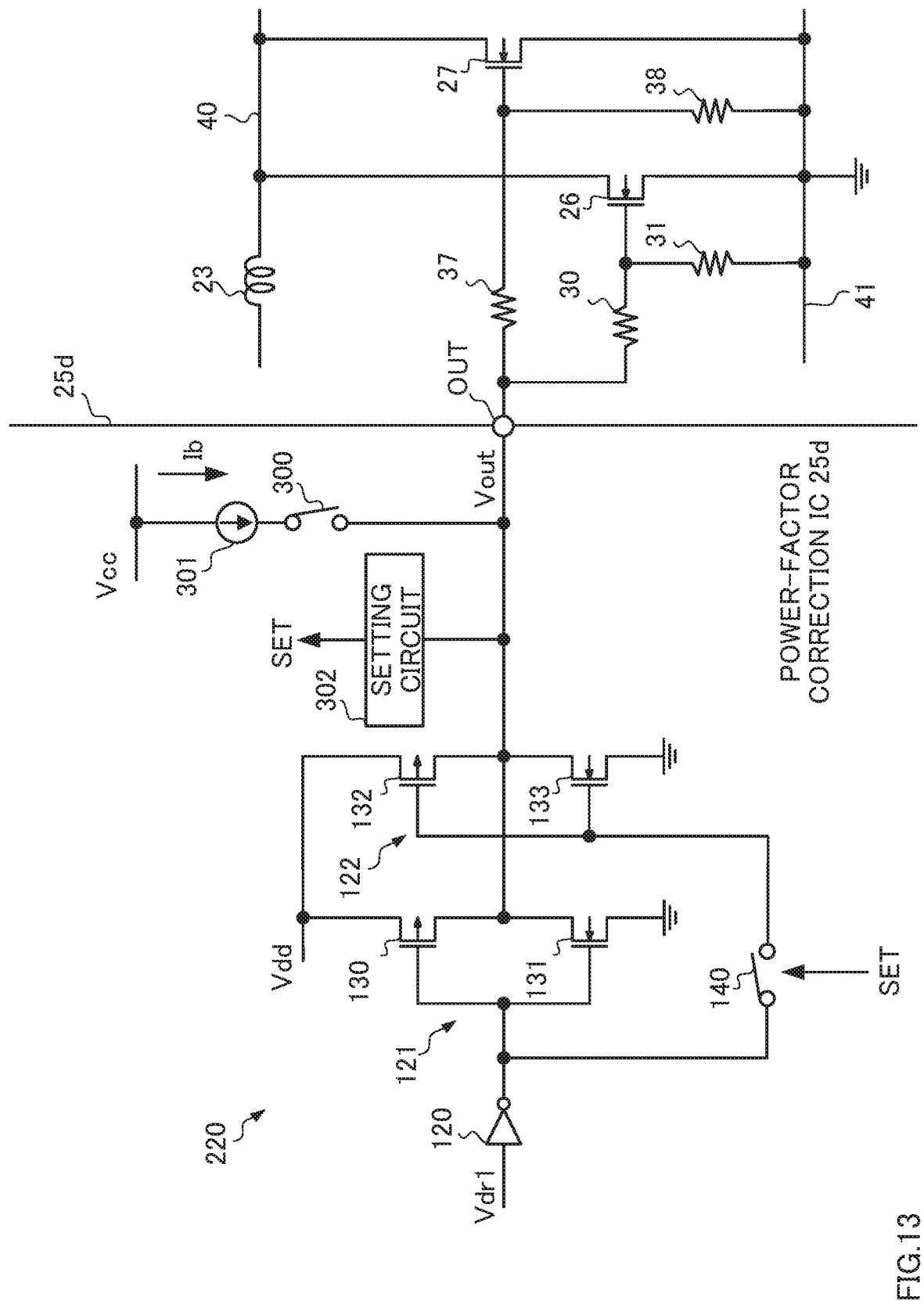
FIG. 13 is a diagram for explaining the details of a buffer circuit 220 and external circuitry.

FIG. 12 is a diagram illustrating one example of a power factor correction IC 25d, which is a power factor correction IC according to a fourth embodiment of the present disclosure. FIG. 13 is a diagram illustrating the details of the elements, such as a power transistor and the like, connected to the terminal OUT of the power factor correction IC 25d. In addition to the NMOS transistor 26 and the like explained with reference to FIG. 1, resistors 37 and 38 and an NMOS transistor 27 are connected to the terminal OUT of the power factor correction IC 25d.

The power factor correction IC 25d is capable of changing the drive capacity of a buffer circuit 220 according to the load (here, the NMOS transistors 26 and 27) connected to the terminal OUT.

Further, the power factor correction IC 25d changes the protection method of the buffer circuit 220 when the ground fault occurs, according to the drive capacity of the buffer circuit 220. Specifically, the power factor correction IC 25d employs the protection by, for example, the "pulse-by-pulse method", when the drive capacity of the buffer circuit 220 is low, and employs the protection by, for example, the "latch method" when the drive capacity of the buffer circuit 220 is high.

The power factor correction IC 25d comprises the signal generating circuit 51, the rising-edge delay circuit 52, the determination circuit 53, the inverter 54, the AND circuit 55, the buffer circuit 220, switches 300 and 310 to 312, a bias current circuit 301, and a setting circuit 302.

Here, the blocks given the same numerical references are the same between the power factor correction IC 25d in FIG. 12 and the power factor correction ICs 25a to 25c. Thus, the buffer circuit 220, the switches 300 and 310 to 312, the bias current circuit 301, and the setting circuit 302 will be described.

<<Buffer Circuit 220>>

FIG. 13 is a diagram for explaining the details of the buffer circuit 220. The buffer circuit 220 performs switching of the transistor(s) connected to the terminal OUT with the drive capacity according to a setting signal SET, and includes the inverters 120 to 122 and a switch 140. Note that since the inverters 120 and 121 are the same as the inverter of the buffer circuit 56 in FIG. 7, the detailed description thereof is omitted.

The inverter 122 comprises a PMOS transistor 132 and an NMOS transistor 133. Further, the output of the inverter 120, the gate electrode of the PMOS transistor 132 and the gate electrode of the NMOS transistor 133 are connected via a switch 140.

Accordingly, when the switch 140 is off, only the inverter 121 out of the inverters 121 and 122 operates, and when the switch 140 is on, the inverters 121 and 122 operate. As a result, when the switch 140 is turned on, on-resistance of the output node of the buffer circuit 220 decreases, thereby improving the drive capacity.

The switch 140 turns on and off the setting circuit 302 (described later) based on the setting signal SET. Specifically, the switch 140 is turned on when the setting signal SET is high, and is turned off when the setting signal SET is low.

<<Switch 300 and Bias Current Circuit 301>>

When the power factor correction IC 25d is activated, the switch 300 is turned on and kept on during a predetermined "time period Tx" and then turned off. Note that, in an embodiment of the present disclosure, neither the signal generating circuit 51 nor the buffer circuit 220 operates in the "time period Tx" but operates after the setting signal SET is input.

The bias current circuit 301 supplies a bias current Ib of a predetermined current value to elements connected to the terminal OUT during the "time period Tx" during which the switch 300 is on.

Here, the levels of the voltage Vout generated based on the bias current Ib are different between the case where only the resistors 30 and 31 are connected to the terminal OUT as illustrated in FIG. 1, for example, and the case where the resistors 30, 31, 37, and 38 are connected to the terminal OUT as illustrated in FIG. 13.

It is assumed here that the values of the resistors 30, 31, 37, and 38 are selected such that the voltage Vout in the "time period Tx" is "1 V" when one single NMOS transistor 26 is connected to the terminal OUT, and is "3 V" when two NMOS transistors 26 and 27 are connected to the terminal OUT.

<<Setting Circuit 302>>

The setting circuit 302 outputs the setting signal SET for setting the drive capacity of the buffer circuit 220 and the protection method of the buffer circuit 220 when the ground fault occurs, based on the level of the voltage Vout in the "time period Tx". Specifically, when the setting circuit 302 is connected to, for example, one single NMOS transistor 26 and the voltage Vout in the "time period Tx" is "1 V", the setting circuit 302 outputs the low setting signal SET to lower the drive capacity of the buffer circuit 220 and select "the pulse-by-pulse method".

In contrast, when the setting circuit 302 is connected to, for example, two NMOS transistors 26 and 27, and the voltage Vout in the "time period Tx" is "3 V", the setting circuit 302 outputs the high setting signal SET to raise the drive capacity of the buffer circuit 220 and select "the latch method". Note that the setting circuit 302 is realized by including, for example, a comparator that determines the voltage Vout in the "time period Tx" and a latch circuit (not illustrated) that latches the output of the comparator.

Note that the low setting signal SET corresponds to a "first signal", the high setting signal SET corresponds to a "second signal". Further, the condition in which the drive capacity set based on the low setting signal SET is low corresponds to a "first condition", and the condition in which the drive capacity set based on the high setting signal SET is high corresponds to a "second condition".

<<Selection of Protection Method (Switches 310 to 312)>>

The switches 310 to 312 are elements for selecting between the "pulse-by-pulse method" and the "latch method" as a method of protecting the buffer circuit 220. That is, according to an embodiment of the present disclosure, the setting circuit 302 changes the output destination of a signal output from the determination circuit 53 according to the drive capacity of the buffer circuit 220.

When the low setting signal SET is output from the setting circuit 302, the switches 310 and 311 are turned off and the switch 312 is turned on. As a result, the signal Va which is the determination result of the determination circuit 53 is input to the AND circuit 55 via the inverter 54. Since this condition is the same as in the power factor correction IC 25a illustrated in FIG. 2, the buffer circuit 220 is protected by "the pulse-by-pulse method". Note that, in this case, the switch 140 in the buffer circuit 220 is turned off, thereby lowering the drive capacity.

The high setting signal SET is output from the setting circuit 302, the switches 310 and 311 are turned on and the switch 312 is turned off. Here, the AND circuit 55 has one input to which the drive signal Vq is input and the other input applied with a voltage Vb. Then, the voltage Vb is a high-level voltage in the AND circuit 55, and thus the AND circuit 55 outputs the drive signal Vq as the input signal Vdr1.

As a result, the signal Va serving as the determination result of the determination circuit 53 is input to the power supply circuit 200. Since this condition is the same as in the power factor correction IC 25b illustrated in FIG. 10, the buffer circuit 220 is protected by "the latch method". Note that, in this case, the switch 140 in the buffer circuit 220 is turned on, thereby raising the drive capacity. Thus, the buffer circuit 220 is capable of appropriately performing switching of a plurality of NMOS transistors 26 such as ten NMOS transistors 26.

<<Operation of Power Factor Correction IC 25d>>

In an embodiment of the present disclosure, in the "time period Tx" after the activation of the power factor correction IC 25d, the switch 300 is turned on, to supply the bias current Ib to resistors 30, 31, 37, and 38 via the terminal OUT. Thus, the voltage Vout at the terminal OUT results in, for example, "3 V", and the setting circuit 302 outputs the high setting signal SET.

Accordingly, the switch 140 in the buffer circuit 220 is turned on and the drive capacity of the buffer circuit 220 is raised. Further, the switches 310 and 311 are turned on and the switch 312 is turned off. As a result, when the ground fault occurs at the terminal OUT, the supply of the power supply voltage Vdd to the buffer circuit 220 is stopped, and the buffer circuit 220 is protected by "the latch method".

===Other Embodiment (One Example of External Buffer Circuit)===

Figure 14:
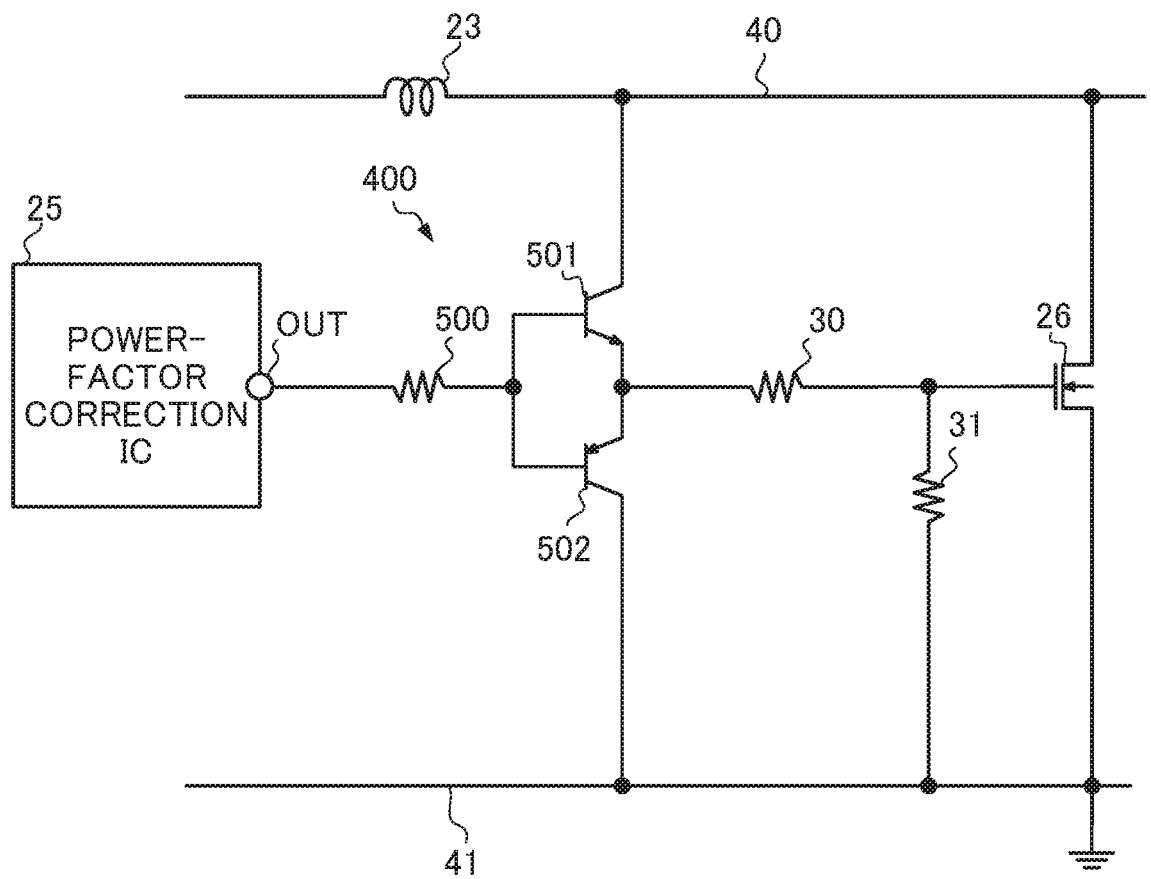
FIG. 14 is a diagram for explaining one example of an external buffer circuit.

FIG. 14 illustrates one example of a buffer circuit provided outside the power factor correction IC 25. A buffer circuit 400 for driving the NMOS transistor 26 may be provided between the terminal OUT and the resistor 30.

The buffer circuit 400 includes a resistor 500, an NPN transistor 501, and a PNP transistor 502. The buffer circuit 400 drives the NMOS transistor 26 using a signal that changes in phase with the logic level of the voltage Vout and that has the amplified current drive capacity. Even with such a circuit being provided, the occurrence of the ground fault at the terminal OUT causes a large current to flow through a buffer circuit inside the power factor correction IC 25. Thus, it is possible to appropriately protect the internal buffer circuit by using the power factor correction IC 25 according to an embodiment of the present disclosure.

===Summary===

The AC-DC converter 10 according to an embodiment of the present disclosure has been described hereinabove. The determination circuit 53 determines whether the ground fault occurs at the terminal OUT, when the timing at which the signal Vd goes high, that is, the timing at which the NMOS transistor 26 is turned on, is detected. As a result, with an embodiment of the present disclosure, it is possible to figure out whether the ground fault occurs at the terminal OUT.

Further, when the ground fault at the terminal OUT is detected, the buffer circuit 56 is protected by "the pulse-by-pulse method". Thus, it is possible to prevent the buffer circuit 56 from being destroyed due to overcurrent.

Further, when an overcurrent flows through the NMOS transistor 26, the buffer circuit 56 turns off the NMOS transistor 26. Accordingly, it is possible to prevent the NMOS transistor 26 from being destroyed.

Further, it is possible to improve power factor of a power supply through the use of the power factor correction IC 25*a* according to an embodiment of the present disclosure, for example.

Further, in the power factor correction IC 25*b*, when the ground fault at the terminal OUT is detected, the supply of the power supply voltage Vdd to the buffer circuit 56 is stopped.

Accordingly, it is possible to reliably protect the buffer circuit 56.

Further, in the power factor correction IC 25*c*, when the ground fault is detected and the time period Td has elapsed after the supply of the power supply voltage Vdd to the buffer circuit 56 is stopped, the power supply voltage Vdd is supplied again. In such a case, it is possible to immediately resume driving the load 11 if the ground fault has been eliminated.

Further, a plurality of power transistors may be connected to the terminal OUT of the power factor correction IC 25*d*. The buffer circuit 220 according to an embodiment of the present disclosure can change the drive capacity for driving a load according to the setting signal SET. Accordingly, it is possible to appropriately drive the power transistors even if the number of power transistors connected to the terminal OUT changes.

Further, in the power factor correction IC 25*d*, the method of protecting the buffer circuit 220 can be changed according to the drive capacity of the buffer circuit 220. Accordingly, for example, even in the case where the drive capacity of the buffer circuit 220 is high and the protection by "the pulse-by-pulse method" is not sufficient, it is possible to appropriately protect the buffer circuit 220 by "the latch method".

Further, an element, such as a resistor 30 and/or the like, connected to the terminal OUT usually changes with the number of power transistors. Accordingly, the drive capacity of the buffer circuit 220 can be set, based on the voltage Vout when the bias current Ib is supplied to the terminal OUT.

Embodiments of the present disclosure described above are simply for facilitating the understanding of the present disclosure and are not in any way to be construed as limiting the present disclosure. The present disclosure may variously be changed or altered without departing from its gist and encompass equivalents thereof.

In an embodiment of the present disclosure, the buffer circuit 56 drives the NMOS transistor 26, however, the buffer circuit 56 may drive a PMOS transistor. In this case, it is possible to obtain similar effects as in an embodiment of the present disclosure, by causing the determination circuit 53 to determine whether the terminal OUT and the power supply line 40 are short-circuited.

Further, the buffer circuit 56 is a voltage drive-type circuit including the PMOS transistor 130 and the NMOS transistor 131 in its output stage, but the buffer circuit 56 may be a current drive-type circuit including a bipolar transistor in its output stage.

Further, it is assumed that the buffer circuit 56 is provided in an integrated circuit that controls the AC-DC converter 10, but it is not limited thereto. The buffer circuit 56 may be provided in an integrated circuit that controls power, such as a power amplifier and/or the like.

Further, the resistors 30 and 31 are provided between the terminal OUT and the gate electrode of the NMOS transistor 26, however, for example, the resistor 31 may not be provided.

Further, other element(s) such as a diode and/or the like may be connected between the terminal OUT and the gate electrode of the NMOS transistor 26. Specifically, a diode having a cathode connected to the terminal OUT and an anode connected to the gate electrode may be provided to promote the discharge of the gate capacitance of the NMOS transistor 26.

What is claimed is:

1. An integrated circuit for a power supply circuit that includes
   a rectifier circuit that rectifies an AC voltage,
   an inductor configured to be applied with a voltage from the rectifier, and
   a transistor configured to control an inductor current flowing through the inductor, the integrated circuit comprising:
   a signal generating circuit that generates a drive signal that reaches a first logic level to turn on the transistor and reaches a second logic level to turn off the transistor;
   a buffer circuit that generates a first voltage for turning on the transistor responsive to the drive signal at the first logic level, generates a second voltage for turning off the transistor responsive to the drive signal at the second logic level, and outputs the generated first or second voltage to a terminal of the integrated circuit;
   a detection circuit that detects elapse of a first time period, which is a time period from a timing when the drive signal reaches the first logic level to a predetermined timing before the drive signal reaches the second logic level, and delays a rising edge of the drive signal by the first time period; and
   a determination circuit that determines whether the terminal is short-circuited, responsive to an output signal from the detection circuit indicating that the first time period has elapsed since the drive signal reaches the first logic level.

2. The integrated circuit according to claim 1, further comprising
   a signal output circuit that receives the drive signal from the signal generating circuit, changes a logic level of the drive signal to the second logic level, and outputs the changed drive signal to the buffer circuit, when the determination circuit determines that the terminal is short-circuited.

3. The integrated circuit according to claim 2, wherein
   the signal generating circuit includes an overcurrent detection circuit that detects whether a current flowing through the transistor is larger than a predetermined value, and
   the signal generating circuit changes the logic level of the drive signal to the second logic level, upon detecting that the current flowing through the transistor is larger than the predetermined value.

4. The integrated circuit according to claim 2, wherein
   the integrated circuit is a switching control circuit that performs switching of the transistor, based on the inductor current and an output voltage generated from the AC voltage, and the signal generating circuit sets the logic level of the drive signal such that the output voltage reaches a target level and the inductor current changes according to a waveform of the AC voltage.

5. The integrated circuit according to claim 1, wherein the buffer circuit outputs the generated first or second voltage to a gate terminal of the transistor, and
the integrated circuit further includes a power supply circuit that stops supplying a power supply voltage for operating the buffer circuit, when the determination circuit determines that the gate terminal is short-circuited.

6. The integrated circuit according to claim 1, further comprising:
a power supply circuit that supplies a power supply voltage to the buffer circuit; and
a timer circuit that measures a predetermined second time period responsive to determination by the determination circuit that the terminal is short-circuited, wherein the power supply circuit
stops supplying the power supply voltage to the buffer circuit when the determination circuit determines that the terminal is short-circuited, and
resumes supplying the power supply voltage to the buffer circuit after lapse of the second time period.

7. The integrated circuit according to claim 1, further comprising
a setting circuit that sets drive capacity of the buffer circuit.

8. The integrated circuit according to claim 7, wherein the setting circuit changes a destination of a signal output from the determination circuit according to the drive capacity of the buffer circuit.

9. The integrated circuit according to claim 7, further comprising
a bias current circuit that supplies a bias current to the terminal when an operation of the buffer circuit is stopped, wherein
the setting circuit sets the drive capacity of the buffer circuit, based on a voltage at the terminal when the bias current is supplied.

10. The integrated circuit according to claim 1, wherein the terminal is connected to the transistor;
the integrated circuit further includes:
a signal output circuit that receives the drive signal from the signal generating circuit, changes a logic level of the drive signal to the second logic level, and outputs the changed drive signal to the buffer circuit, when the determination circuit determines that the terminal is short-circuited, wherein
the signal output circuit
outputs the changed drive signal at the first logic level in a first period, and outputs the changed drive signal at the second logic level in a second period, when the determination circuit detects that the terminal is short circuited, and
outputs the changed drive signal at the first logic level in a third period longer than the first period, and outputs the changed drive signal at the second logic level in a fourth period shorter than the second period, when the determination circuit does not detect that the terminal is short circuited;

the buffer circuit generates the first voltage for turning on the transistor responsive to the changed drive signal at the first logic level, and generates the second voltage for turning off the transistor responsive to the changed drive signal at the second logic level, when the determination circuit does not detect that the terminal is short circuited; and
the buffer circuit holds outputting the second voltage for turning off the transistor, when the determination circuit detects that the terminal is short circuited.

11. An integrated circuit for a power supply circuit that includes
a rectifier circuit that rectifies an AC voltage,
an inductor configured to be applied with a voltage from the rectifier, and
a transistor configured to control an inductor current flowing through the inductor, the integrated circuit comprising:
a buffer circuit that generates a first voltage for turning on the transistor when a drive signal reaches a first logic level, generates a second voltage for turning off the transistor when the drive signal reaches a second logic level, and outputs the generated first or second voltage to a terminal of the integrated circuit;
a bias current circuit that supplies a bias current to the terminal when an operation of the buffer circuit is stopped; and
a setting circuit that sets the drive capacity of the buffer circuit, based on a voltage at the terminal when the bias current is supplied.

12. An integrated circuit for a power supply circuit that includes
a rectifier circuit that rectifies an AC voltage,
an inductor configured to be applied with a voltage from the rectifier, and
a transistor configured to control an inductor current flowing through the inductor, the integrated circuit comprising:
a signal generating circuit that generates a drive signal that reaches a first logic level to turn on the transistor and reaches a second logic level to turn off the transistor;
a buffer circuit that generates a first voltage for turning on the transistor responsive to the drive signal at the first logic level, generates a second voltage for turning off the transistor responsive to the drive signal at the second logic level, and outputs the generated first or second voltage to a terminal of the integrated circuit;
a detection circuit that detects elapse of a first time period, which is a time period from a timing when the drive signal reaches the first logic level to a predetermined timing before the drive signal reaches the second logic level;
a determination circuit that determines whether the terminal is short-circuited when it is detected that the first time period has elapsed since the drive signal reaches the first logic level; and
a setting circuit that sets drive capacity of the buffer circuit, wherein
the setting circuit changes a destination of a signal output from the determination circuit according to the drive capacity of the buffer circuit.

\* \* \* \* \*